US008244576B2

(12) United States Patent
Waddington

(10) Patent No.: US 8,244,576 B2
(45) Date of Patent: Aug. 14, 2012

(54) CALCULATING THE BENEFIT OF AN INVESTMENT IN TRAINING

(75) Inventor: Tad S. H. Waddington, Hoffman Estates, IL (US)

(73) Assignee: Accenture Global Services Limited, Dublin (IE)

( * ) Notice: Subject to any disclaimer, the term of this patent is extended or adjusted under 35 U.S.C. 154(b) by 2483 days.

(21) Appl. No.: 10/349,766

(22) Filed: Jan. 23, 2003

(65) Prior Publication Data

US 2004/0148216 A1 Jul. 29, 2004

(51) Int. Cl.
G06Q 10/00 (2012.01)
(52) U.S. Cl. .................................. 705/7.38; 705/7.42
(58) Field of Classification Search .................. 705/38, 705/42
See application file for complete search history.

(56) References Cited

U.S. PATENT DOCUMENTS

| 5,775,734 | A | 7/1998 | George, Jr. |
| 6,240,399 | B1 | 5/2001 | Frank et al. |
| 6,275,814 | B1 | 8/2001 | Giansante et al. |
| 2002/0103682 | A1 | 8/2002 | Stemmer et al. |
| 2002/0143599 | A1* | 10/2002 | Nourbakhsh et al. ........... 705/9 |
| 2003/0009346 | A1 | 1/2003 | Shimizu |
| 2003/0177060 | A1* | 9/2003 | Seagraves ........................ 705/11 |
| 2003/0182178 | A1* | 9/2003 | D'Elena et al. ................. 705/11 |
| 2003/0187723 | A1* | 10/2003 | Hadden et al. ................. 705/11 |

OTHER PUBLICATIONS

Phillips, Jack J. Return on Investment in training and performance improvement programs. Gulf Publishing: 1997, Chapters 1 and 3-7.*
Worthen, Ben. "Measuring the ROI of Training" CIO. Feb. 15, 2001, v14, n9, 5 pgs.*
Cross, Jay. "A Fresh Look at ROI" Learning Circuits, Jan. 2001, 6 pgs [downloaded from www.learningcircuits.org/2001/jan2001/cross.html on Jul. 7, 2006].*
Parry, Scott B. "Measuring Training's ROI" Training & Development, May 1996, v50, n5, 6 pgs.*
Author unknown, "The Scientific Contributions of James Heckman and Daniel McFadden," published by Kungl. Vetenskapsakademien—the Royal Swedish Academy of Sciences, Stockholm, Sweden, published on or after 2000, pp. 1-16.
Author unknown, "Corporate University Awards—Excellence in Education," published by Financial Times, May 31, 2002, two pages.
Author unknown, "Appraising Training at the Enterprise Level: Accenture's Big Picture Approach," Corporate Universities International, vol. 8, No. 4, Jul./Aug. 2002, pp. 1-5.
Wright, Ben, "Sample-free Test Calibration and Person Measurement," available on internet at http://www.rasch.org/memo1.htm as of Aug. 16, 2002, 12 pages.
Shepherd, Clive, "Assessing the ROI of Training," available on internet at http://www.fastrak-consulting.co.uk/tactix/Features/tngroi/tngroi.htm as of Oct. 4, 2002, 7 pages.

* cited by examiner

Primary Examiner — Dave Robertson
(74) Attorney, Agent, or Firm — Brinks Hofer Gilson & Lione

(57) ABSTRACT

A system and method for calculating a return on investment made in training. The system includes at least one computer having access to networks and servers to collect and synthesize accounting, training, and personnel data, in order to calculate costs and benefits of training. The method for calculating costs and benefits includes steps of collecting data, calculating contributions by members of the organization, calculating costs incurred by members of the organization, and correlating contributions made by members with training received by members of the organization.

22 Claims, 4 Drawing Sheets

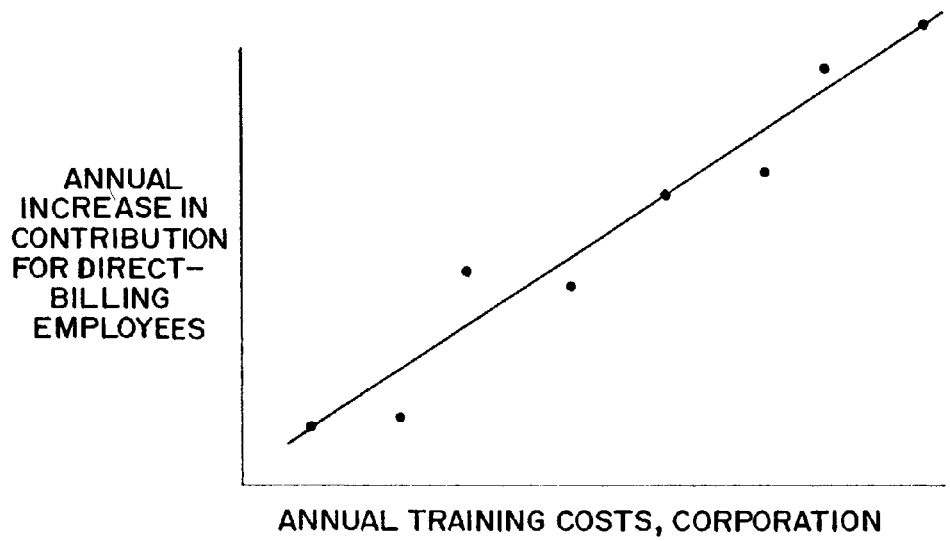
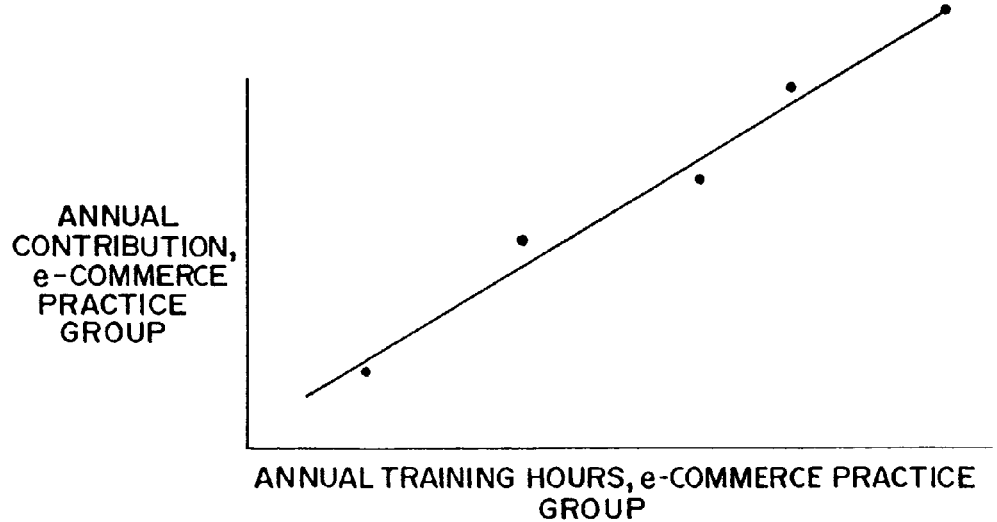

CALCULATING THE BENEFIT OF AN INVESTMENT IN TRAINING

FIELD OF THE INVENTION

This invention generally relates to a data processing system for extracting data from disparate data servers useful for determining a return on an investment made in training for a given period and also useful in determining an investment in a subsequent period.

BACKGROUND OF THE INVENTION

Companies, especially business organizations, invest significant amounts of scarce resources, money and manpower hours, in training. A recent study of five major consulting organizations revealed that their average training budget exceeded $163 million annually. Organizations generally agree that training of employees is a necessary expense, whether the employees are termed "members" of an organization, or "associates," or "employees." It is not so easy, however, to agree on specifically what training should be undertaken, or by which employees, whether of the organization as a whole, or by portions of the organization.

Organizations may be faced with many choices in providing training for their employees. For example, it may be desirable to provide employees with training in a newly-updated state-of-the-art computer software program, while at the same time those same employees might also benefit from cross-training in related disciplines. It may also be desirable to train those same employees in subject matter specific to the organization, such as the capabilities and possibilities of other remote portions of the organization.

In addition to training courses which may be considered desirable by employees or managers of the organization, some courses may be required by local, regional, or national law, such as a continuing-education requirement for engineers, doctors or lawyers. In any case, these courses may be required for the employee to participate in the particular profession, and the courses may also be of interest to or helpful to client-facing or direct-billing professionals.

Training is unlike other corporate investments. It is difficult to determine the benefit to the organization. Investments in working capital, bonds, stock-buy-backs, and certificates of deposit have a measurable return. The return may be measured in an annual profit, or a growth of capital, or an annual return on the investment. With training, there is a possibility that the employees and the organization might benefit from any or all of the training course available to employees. While the cost of training may be measured, there is presently no way to easily quantify the benefit of that training and to use the data in a manner that will demonstrate to the organization that there is a tangible benefit to the organization from its training budget.

SUMMARY

This present invention seeks to meet these needs with a computer-based data processing method for analyzing a benefit of an investment in training for an organization. The method is characterized in that the method gathers and processes computer-based data on contributions, costs, and training for members of the organization. The method comprises steps of: (a) collecting contribution, cost and training data for members of the organization from a plurality of data stores; (b) calculating a contribution for the members of the organization; (c) calculating a training cost for members of the organization; (d) determining an experience level for each of the members; (e) correcting the contribution for the effect of experience; (f) determining a relationship between corrected contribution and training; (g) calculating an average cost and an average benefit of training for a period of time; and (h) displaying the average cost of training and average benefit in human readable form.

Another aspect of the invention is a computer-based data processing method for calculating a cost and a benefit of an investment in training for members of an organization. The method is characterized in that the method processes computer-based data on contributions, costs, and training for members of the organization. The method comprises: (a) collecting contribution, cost, and training data for members of the organization from memories of computers storing the data; (b) calculating a revenue contribution for members of the organization; (c) calculating a personnel cost for members of the organization; (d) correcting the revenue contribution for the effect of experience; (e) determining a correlation between corrected revenue contribution and training; (f) calculating a benefit of training for a period of time; and (g) determining a training investment in a subsequent period of time to achieve a target return on the training investment.

Another aspect of the invention is a system or apparatus for calculating a cost and a benefit of a training investment in members of an organization. The system comprises at least one computer for accessing data and a memory accessible to the computer, the memory having computer-readable code embodied therein for storing data. The system also comprises a network linking the at least one computer to at least one of a human resources network, an accounting network and a payroll network, wherein the at least one computer is capable of retrieving revenue, cost, and training data, the data stored on at least one computer-readable medium. The system also comprises a computer program embodied on a computer-readable medium for calculating a revenue contribution, a personnel cost and a training cost for the members of the organization, wherein the computer program uses the revenue, cost, and training data to calculate a cost and a benefit of training for members of the organization for a period of time.

One advantage of the invention is that an organization may now readily compute a benefit, as well as a cost, of training, and then may make organizational decisions as to how to allocate scarce resources, such manpower and training budget, among employees. The organization may also use the information on costs and benefits of training to decide what amount, if any, to spend on training. The organization may use a target return on investment for a subsequent period of time to determine the investment in training for that period. Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

FIGS. 4-5 are graphs charting the costs and benefits of training for a corporation and for a small part of the corporation.

DETAILED DESCRIPTION OF THE PREFERRED EMBODIMENTS

Figure 1:
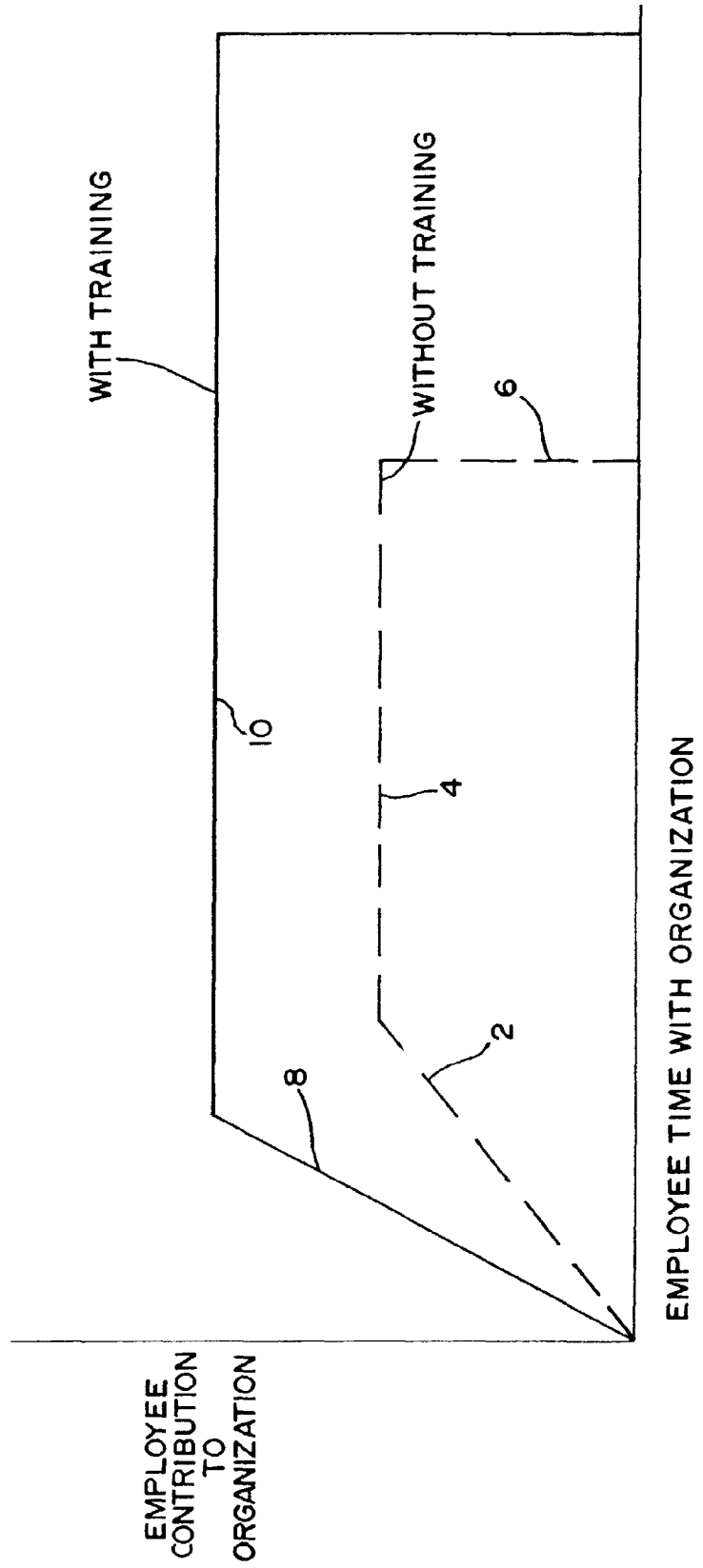
FIG. 1 is a conceptual model showing the forces that drive the benefit of training.

FIG. 1 is a graph depicting the value of training an employee in an organization. The horizontal axis represents the length of time an employee may be employed by an organization, while the vertical axis represents the contribution an employee makes to the organization. In one sense, the contribution an employee makes to the organization may be measured by the revenue contributed by the employee. For example, for an employee whose productive time is billed to customers, contribution is defined as the employee billing rate multiplied by the number of hours billed. If there is more than one billing rate during a period (perhaps a calendar or fiscal year), contribution may be defined as a sum of billing rates multiplied by the hours billed at those rates. An increase in contribution, therefore, may be defined as either an increased billing rate multiplied by the number of hours billed, or the increased hours billed multiplied by the billing rate. Of course, an increase in contribution may include gains from both higher billing rates and increased hours billed.

The dotted line 2 in FIG. 1 represents an employee without training, or with minimal training, while the solid line 8 represents an employee with optimal amounts of training. The dotted line takes longer than the solid line to reach what might be termed a steady-state level 4. The dotted line also ends 6 in this graph, indicating that the employee is no longer with the organization. In contrast, the solid line represents an upper limit 10 of what is possible with an employee who receives the benefit of training by the organization. The trained employee is on a quicker learning curve, as seen by the greater slope 8 of the solid line. Solid line 10 is at a higher level than dotted line 4, indicating that the trained employee makes greater contributions to the organization. The solid line also continues after the dashed line has ended, suggesting that a trained employee may be retained longer than an untrained employee.

Figure 2:
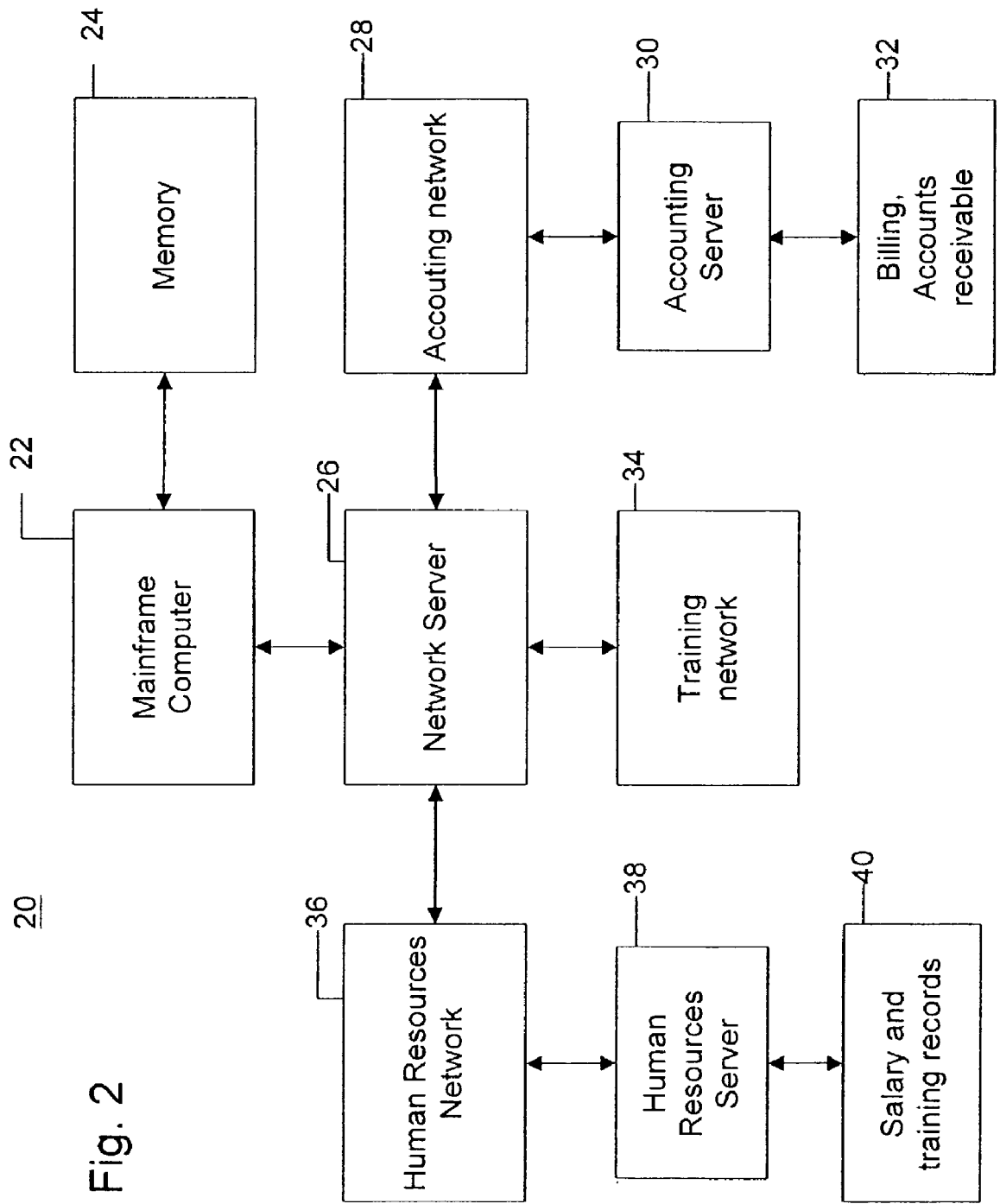
FIG. 2 represents a block diagram of a system for calculating costs and returns on a training investment.

If the differences between the contributions of trained and untrained employees are as great as FIG. 1 seems to suggest, there should be a way to measure these contributions. There may also be a way to measure the cost of the training. FIG. 2 represents a system 20 for storing and retrieving data relating to employee revenue generation, employee costs, and employee training. The system includes a mainframe computer 22 which may be operably connected to system storage or memory 24 for storing such data. There may be one or more network servers 26 for communicating, sending and receiving data between several other computer systems, such as an accounting computer network 28, a training department network or computer 34, and a human resources network or computer 36. The accounting computer network 28 may also include an accounting server 30 and storage or memory 32 for billing and accounts receivable data. The human resources network 36 may include a human resources network server 38 and storage or memory 40 for salary and training records.

These databases may include a variety of costs and revenues that are useful in calculating the costs and benefits of training. Billing data may contain the billing records of employees, such as their billing rate and the number of hours billed for each contract, and the customers or clients for which those hours were billed. Training data in the training network may include data on training courses available to employees, and related information, such as which employees received the training, how long the training lasted (such as the hours of training), the out-of-pocket expense of the training, and the like. Out-of-pocket expenses may include fees for instructors, materials, training aids, and so on. Human resources data may include a variety of information, such as the hiring date of an employee, a record of the courses of training taken, a record of how many hours or days were spent on training, an experience level of the employee, and the like. Cost databases in the training department or in accounting (such as in an accounts payable record) may include costs of hiring instructors, costs of facilities for training, costs of personnel to man and manage both training and facilities, and the like. Data stored in one or more of these databases and accessed by a computer may also be selectively stored in one or more memories accessible to the computer used. The data may be stored on computer-readable media, such as a floppy disc, a compact disc, a read-only memory, a disk drive, magnetic tape, or any other suitable medium.

In addition to these data, the computer may also store a computer program for calculating the costs and the benefits of training. The computer program may manipulate the data to determine information useful in calculating costs and benefits of training. The computer program may be embodied on a suitable computer-readable medium, and may be used to calculate revenue contribution for members of the organization, and may also be used to calculate the cost of employing the members of the organization, as well as the costs of training members of the organization. The computer program may also calculate other information useful in determining the costs and benefits of training. For instance, an opportunity cost of training may be considered to be the revenue that an employee would otherwise have generated during the time period he or she was engaged in training. Therefore, the computer can access the time spent by a particular employee in a particular training course at a particular time, and the computer can also access the billing rate for the employee at that time. By simply multiplying the billing rate by the time foregone in training, an opportunity cost for the particular employee for the particular course may be determined. The computer program, embodied on a suitable computer-readable medium, may reside on any computer useful in the system, or it may reside on the storage medium so long as the program is accessible by a suitable computer to process the data and achieve the desired result.

In the same manner, other data may be transformed into useful cost and benefit information. For instance, information on employee retention and employee performance may also be correlated with training data to determine whether trained employees perform better and are retained longer. Information on whether particular courses contribute to employee performance and longevity may also be determined by "mining" personnel data, billing data, and training data.

Figure 3:
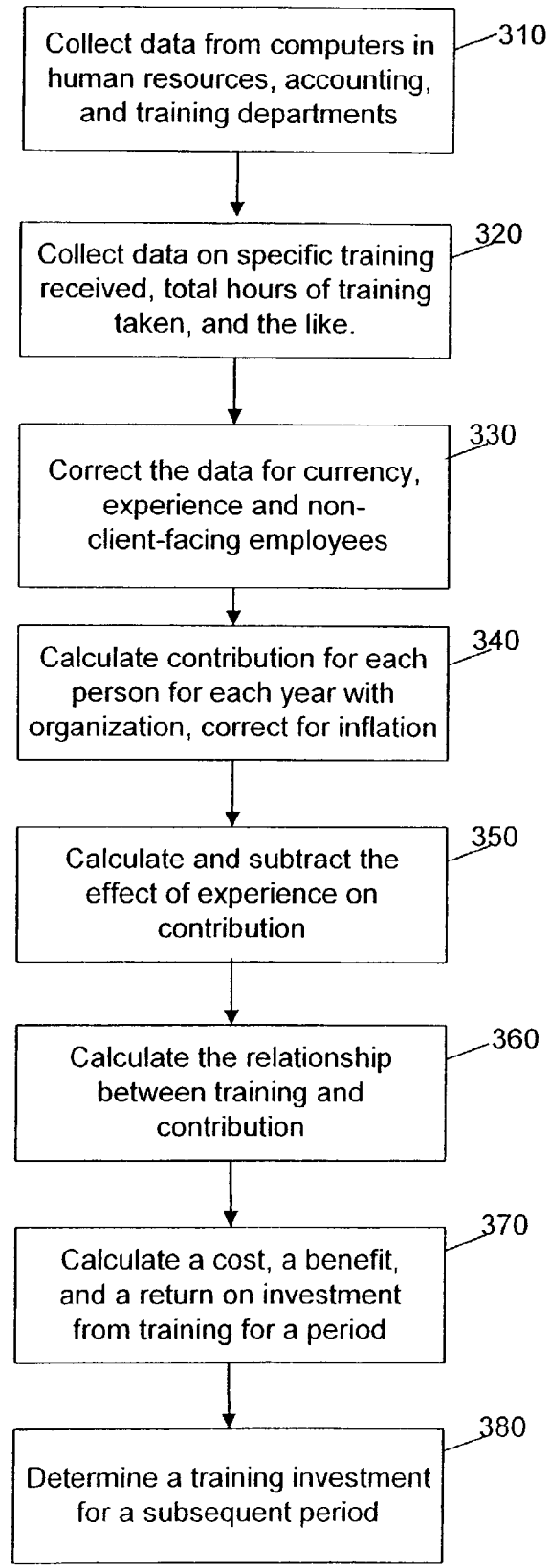
FIG. 3 is a method for calculating the benefits and costs of an investment in training for employees of an organization.

FIG. 3 depicts a flowchart for a method of calculating the costs and benefits of providing training to members of an organization. In the method, one step 310 comprises collecting data on the employees of interest. This data may include hours billed by each employee, the billing rate for the hours billed, the total hours paid by the organization to the employee, the length of time (years) each employee has been with the organization, the number of hours of training, and so on. Some of these data focus on the benefit provided to the organization by the employee. For instance, revenue generated may be calculated by simply multiplying the employee billing rate times the number of hours billed to customers for each period. Thus, a contribution of an employee may be his or her annual revenue, or his or her billing rate multiplied by the annual number of hours billed. These data may be collected and processed for each year the employee has been with the organization, thus providing a multi-year stream of data for every employee in the organization. These data may be collected from the databases mentioned above, and stored as desired, such as in the training department network. Data or information derived from these data may be stored in another memory of the computer that collects data and calculates desired results using this method.

Another step 320 in the method is to collect data on the training received by members of the organization. The data collected desirably includes a quantitative measure of training taken, such as hours of training, preferably broken down by training course. This data may be stored in personnel records or in training records, most conveniently on a computer-accessible database. The data should include specific training received by members of the organization. There should also be information on the course itself, such as the length of time and location of the course, the instructor or instructors for the course, and any costs specifically associated with the course, such as instructor fee or salary, any equipment costs, or rental, or any depreciation associated with the equipment or facilities needed for the training, and the like. This step may also include collecting data on the opportunity cost of training, i.e., revenue foregone because members of the organization were in training rather than performing tasks billable to clients. These members may include any workers able to bill by time on the task, including consultants, accountants, lawyers, engineers, mechanics, electricians, and so on.

Another step 330 in the method is to correct or "clean" the data, that is, to make the data useful over a large number of employees or members of the organization. Thus, the data should be converted to a common currency, if some of the cost data is for some reason in a different currency. In order to focus on the benefits of training, it may be useful to exclude analysis of personnel with experience prior to joining the organization, since it may not be possible to accurately gauge the full measure of training experiences that they may have received.

It may also be useful to exclude employees that do not directly generate revenue, since it will be very difficult to measure any increased contribution from these employees. For instance, in many organizations of professionals, the contribution of each professional who directly generates revenue is relatively easy to measure. The contribution may be simply the revenue generated by that employee as he or she bills hours to a customer at a given rate, minus the amount the employee is paid, such that a per person margin is calculated. Thus, contributions by client-facing employees may be relatively straightforward to measure. On the other hand, the contribution of certain internal departments and employees may be very difficult to measure, especially if they are not directly billed to an external customer or client. For instance, there may be little doubt that an internal audit staff or a training department is necessary for an organization. Nevertheless, the contributions of their members may be very difficult to measure, even if their departmental costs are charged out to their "internal customers," since they do not directly generate revenue for the organization. The effect of training on the contribution of these employees is even more difficult to measure. Therefore, it may be prudent to exclude employees who do not directly generate revenue from a calculation of the costs and benefits of training, not because they do not contribute, but because the benefit to the organization may be too difficult to measure.

With the previous steps of the method completed, the data have been refined and a number of employees or departments may have been eliminated from consideration in the calculation. Another step 340 in the method is to calculate the contribution for each person for each year that person has been with the organization. The calculation may simply be the person's billing rate multiplied by the number of hours billed. This formula may work well for any number of service organizations, such as accounting firms, consulting firms, engineering firms, and the like, or organizations having such departments or functions from which revenue is directly generated. A correction for inflation may be introduced as desired, in order to make the data meaningful over at least a several-year period of time. One way is to provide a correction factor (a multiplier or divisor) based on an average or a specific rate of inflation (one correction factor per year), to apply the correction factor, and then to restate the contributions in a common currency for a particular year. For instance, contributions over a five year period may be restated as "2001 U.S. dollars."

Another step 350 in the method is to subtract the effect of experience on contribution. Experience may be quantified, as in years of experience with the organization. After correcting for inflation, and converting all revenue streams and contributions to a common currency, an expected value of contribution may be calculated by plotting the years of experience (or other desired experience measure) against the net contribution for each person. A best-fit linear regression is then made, using least-squares regression to calculate the relationship between experience (E) and a corrected net contribution (C), resulting in an equation for a line in the form $$C=a+m*E$$

where a is a constant (the y-intercept) and m is the slope of the line. Then for every increment of experience (such as a particular number of years or months with the organization), an expected value of contribution, "E" is calculated. This expected value of contribution is then subtracted, for each person, from that person's actual net contribution, thus yielding an incremental amount of contribution. The incremental contribution for a person will be positive if the person's contribution (C) exceeded the contribution expected from the regression. The incremental contribution will be negative if the person's contribution was less than the contribution expected from the regression. Thus, for each person, an incremental value of contribution is calculated, by subtracting the effect of experience on net contribution.

With the data now cleaned and unbiased, the next step 360 in the method is to correlate the amount of training for the employees with the incremental contribution made by the employees or the members of the organization. This method may also be used to correlate with contribution the amount of training received by a particular member or by a group of members. A regression analysis may be used to correlate a measure of employee training, such as the total number of hours of employee training, with the incremental employee contributions calculated in the previous step. In this step, a single variable linear regression may be used with the amount of training as the independent variable and incremental contribution as the dependent variable. The least-squares method, which is available on any number of commercially-available software packages, was used. Examples of software that may be used include: Microsoft® Excel, from Microsoft Corp., Redmond, Wash.; SAS/STAT® software from SAS, Cary, N.C.; and SPSS 11.5 software, from SPSS, Chicago, Ill.

Any of these programs yield a result of the form y=m*x+b, where y is the incremental contribution for an individual, m is a measure of training, such as the hours of training experienced, and x is an incremental amount of contribution per hour of training. The constant "b" may be a base amount of incremental contribution, for instance, at zero hours of training. If the least squares program correlates incremental contribution to hours of training, one outcome of a least squares analysis is a calculation of a dollar amount of incremental contribution due to each hour of training.

Having now calculated the relationship between training and contribution, it is relatively simple to calculate a return on investment, step 370 in FIG. 3, by calculating a benefit due to training, a cost of the training, and then dividing the benefit by the cost to calculate a return on the training investment. The benefit of the training was calculated above in step 340, the contribution for each person, or collectively for the organization. This contribution data was subsequently refined by correcting for currency, inflation and experience. What remains is the benefit of training, correlated with the amount of training. Training costs may be calculated from the other data mentioned above, such as the direct costs of instructors, materials, facilities, and the like, as well as the opportunity costs of revenue foregone during the time spent on training. The return on the investment is the increased contribution divided by the amount spent on training. Return equals increased contribution minus cost of training, divided by the cost of training. The data may have more significance if it is limited to a definite period of time, such as an annual increased contribution and an annual cost of training. Then, an annual return on investment (ROI) may also be calculated for that period of time, where the ROI=[(net contribution−cost)/cost]. The return on investment may then be compared to a target return to see whether the organization is meeting its goals. The program may then be used to determine a training investment 380 for a subsequent period, e.g., the next calendar year or quarter.

The system and the method described above may have many other refinements and components. For instance, there may be a computer system, perhaps in the training department or training network, for periodically gathering data and updating calculations, perhaps every quarter or three months. The computer system may perform the analysis by collecting data on training, and may update contribution by collecting billing and revenue data periodically. The data may be gathered for every employee or associate of the organization, and the data may include each of the measures mentioned above: hours billed, billing rate, hours of training, and the like. The data may be further refined if contribution is measured only by employees assigned to a specific job or jobs and billing their time to a specific job or jobs. In this embodiment, employees or associates who do not charge their time directly to a customer or to a specific job may be considered "overhead" or indirect-charge employees. The data gathered for contribution may automatically include only direct-charge or "client-facing" employees.

The data gathered for the cost of training may also be fine-tuned, or adjusted to reflect costs of training for all employees or only for direct-charge or "client-facing" employees. In one sense, ignoring the cost of training for "overhead" or "indirect-charge" employees may be short-sighted, since some amount of training for all employees may be needed whether they bill directly or not. In addition, the incremental cost of a necessary training course for indirect-charge employees may be very small, in the sense that if only direct-charge employees attend those courses, the cost per trainee may increase because of a smaller number of trainees per course. Therefore, it may be more conservative to lump all training costs, for direct charging and non-direct charging employees, into a "cost of training" account, and to use that amount. An alternative would be to measure a return on investment for training for specific groups or even for individuals.

FIGS. 4 and 5 depict graphs of data that have been gathered and processed to reveal the desired information concerning the costs and the benefits of training. The horizontal axis in FIG. 4 charts the annual costs of training that have been gathered for a corporation, while the vertical axis charts the increase in contribution that has been made by the direct-billing employees of the corporation. The data has been gathered and processed as described above, i.e., converted into a common currency, corrected for inflation, and the like. In this example, the contribution data has also been corrected for the experience of the direct-billing employees. More experienced employees, typically having a diverse mix of training experiences, may be segregated from these data because there is no predictable way to account for their training and experience levels. In one example, the annual benefit of training per employee was about $25,000, and the net return on investment was about 350%. That is, for every dollar spent on training in a particular year, the average client-facing employee had an increase in contribution of $4.50, or a net increase of $3.50 per dollar of training investment.

While the data of FIG. 4 is aggregated for a corporation, it may also be dis-aggregated into a smaller working group, as shown in FIG. 5, which charts similar information for a smaller work group, such as an e-commerce consulting practice group. In this example, there were about one hundred employees in the work group, including direct-billing consultants, office personnel, and managers. The cost of training for the group has been aggregated from the same databases used for the corporate calculations, by selecting only the persons in this workgroup during the time in question. The annual increases in contribution by the members of the group directly contributing has also been gathered from the same databases used for the corporate calculations. As mentioned above, the primary components of contribution are a direct-billing employee's billing rate and the number of hours billed. The factors mentioned above for correction have also been applied to the numbers used for the graph.

Various embodiments of the invention have been described and illustrated. However, the description and illustrations are by way of example only. Other embodiments and implementations are possible within the scope of this invention and will be apparent to those of ordinary skill in the art. For instance, data may be gathered and information generated that demonstrates that a particular training course may be of more use to one work group than another. Therefore, the invention is not limited to the specific details, representative embodiments, and illustrated examples in this description. Accordingly, the invention is not to be restricted except in light as necessitated by the accompanying claims and their equivalents.

What is claimed is:

1. A computer-based data processing method for analyzing a benefit of an investment in training for an organization, the method comprising:
   providing a computer system;
   collecting computer based contribution, cost and training data for members of the organization from a plurality of data stores;
   calculating, by the use of the computer system, a contribution for members of the organization;

calculating, by the use of the computer system, a training cost for members of the organization;
determining an experience level for each of the members;
correcting, by the use of the computer system, the contribution for the effect of experience;
determining, by the use of the computer system, a relationship between corrected contribution and training;
calculating, by the use of the computer system, an average cost and an average benefit of training for a period of time; and
displaying the average cost and average benefit in human readable form.

2. The method of claim 1, wherein the collecting comprises collecting data selected from the group consisting of a billing rate, a number of hours billed, a cost rate, a cost total, a measure of training, and a length of time a member is with the organization.

3. The method of claim 1, further comprising converting monetary data to a common currency.

4. The method of claim 1, further comprising calculating a return on investment for training.

5. The method of claim 1, wherein the collecting, the calculating a contribution and the calculating a training cost processes are accomplished on an individual basis for members of the organization.

6. The method of claim 1, further comprising calculating an organizational benefit of training by aggregating individual benefits of training of the members of the organization.

7. The method of claim 1, further comprising calculating an annual benefit of training of a member of the organization by multiplying the average benefit by a number of hours training for the member in a year.

8. The method of claim 1, further comprising calculating a career benefit of training of a member of the organization by multiplying the average benefit by a number of hours training for the member.

9. The method of claim 1, wherein at least one of the determining an experience level and correcting the contribution processes is accomplished with a least-squares linear regression.

10. The method of claim 1, further comprising correcting the contribution and cost data for inflation.

11. The method of claim 1, further comprising determining an expenditure for training in a subsequent period of time so that a target return on investment is achieved.

12. A computer-based data processing method for calculating a cost and a benefit of an investment in training for members of an organization, the method comprising:
providing a computer system;
collecting, by the use of the computer system, contribution, cost, and training data for members of the organization from memories of computers storing the data;
calculating, by the use of the computer system, a revenue contribution for the members of the organization;
calculating, by the use of the computer system, a personnel cost for the members of the organization;
correcting, by the use of the computer system, the revenue contribution for an effect of experience;
determining, by the use of the computer system., a correlation between corrected revenue contribution and training;
calculating, by the use of the computer system, a benefit of training for a period of time;
determining a training investment in a subsequent period of time to achieve a target return on the training investment; and
displaying the benefit of training for a period of time in human readable form.

13. The method of claim 12, further comprising calculating a return on investment for training.

14. The method of claim 12, wherein the members of the organization are a subset of employees of an organization that meet criteria of generating revenue by billing customers for their services.

15. A system for calculating a cost and a benefit of a training investment in members of an organization, the system comprising:
at least one computer for accessing data and a memory accessible to the computer, the memory having computer-readable code embodied therein for storing data;
a network linking the at least one computer to at least one of a human resources network, an accounting network and a payroll network, wherein the at least one computer is capable of retrieving revenue, cost, and training data, the data stored on at least one computer-readable medium; and
a computer program embodied on a computer-readable medium for calculating a contribution, a personnel cost and a training cost for the members of the organization, wherein the computer program uses the revenue, cost, and training data to calculate a cost of training and a benefit of training for the members of the organization for a period of time by correcting the contribution for the effect of experience and determining a relationship between the corrected contribution and training.

16. The system of claim 15, wherein the computer program embodied on a computer-readable medium is capable of determining an investment in training for a subsequent period so that a target return on investment is achieved.

17. The system of claim 15, wherein the computer program embodied on a computer-readable medium calculates a return on investment in training made for the members of the organization.

18. The system of claim 15, wherein the computer program includes a least-squares routine and a linear regression routine for determining the relationship between the corrected contribution and training.

19. A method for determining a benefit of employee training in an organization comprising:
accessing one or more databases containing personnel data for employees in the organization, the one or more database including personnel data comprising revenue contribution and training costs;
selecting a sub-group of employees in the organization that meet a predefined criterion;
retrieving personnel data for the sub-group of employees;
regressing, by the use of a computer system, revenue contribution of the sub-group of employees against experience level of the sub-group of employees to determine an incremental contribution independent of experience;
calculating, by the use of the computer system, a return on investment based on the incremental contribution and the training costs; and
displaying the training costs in human readable form.

20. The method of claim 19 further comprising regressing the incremental contribution against the training costs to determine an incremental benefit of training for the organization.

21. A computer program embodied on a computer-readable medium for determining the benefit of employee training in an organization comprising:
a code segment for selecting a sub-group of employees in the organization that meet a predefined criterion;

a code segment for performing a regression analysis on a revenue contribution and an experience level for each of the employees of the selected sub-group to determine an incremental contribution; and a code segment for determining a return on investment based on the incremental contribution and a training cost for each of the employees of the selected subgroup.

22. The computer program embodied on a computer-readable medium for determining the benefit of employee training in an organization as recited in claim 21 further comprising a code segment for determining an incremental benefit of training for the organization.

* * * * *